US007421769B2

(12) United States Patent
Lawrence et al.

(10) Patent No.: US 7,421,769 B2
(45) Date of Patent: Sep. 9, 2008

(54) STUD INSTALLATION TOOL AND METHOD OF STUD INSTALLATION

(75) Inventors: Robert Lawrence, Lakeville, MA (US); Robert Bolmarcich, Oakdale, LA (US); Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 31 days.

(21) Appl. No.: 11/329,277

(22) Filed: Jan. 10, 2006

(65) Prior Publication Data

US 2007/0157444 A1 Jul. 12, 2007

(51) Int. Cl.
*B23P 19/04* (2006.01)

(52) U.S. Cl. .......................................... 29/264; 29/255

(58) Field of Classification Search ........... 29/264–267, 29/255

See application file for complete search history.

(56) References Cited

U.S. PATENT DOCUMENTS

| | | | | |
|---|---|---|---|---|
| 1,289,611 | A * | 12/1918 | Beddard | 29/265 |
| 2,290,427 | A * | 7/1942 | Harrington | 29/265 |
| 4,741,229 | A | 5/1988 | Rachanski et al. | |
| 4,872,254 | A | 10/1989 | Chancellor | |
| 5,209,623 | A | 5/1993 | Krehnovi | |
| 5,727,298 | A * | 3/1998 | Strong | 29/259 |
| 5,839,180 | A | 11/1998 | Hochmiller | |
| 6,505,390 | B2 | 1/2003 | Emanuel | |
| 6,618,920 | B1 | 9/2003 | Emanuel | |
| 6,823,574 | B2 | 11/2004 | Swanson | |
| 2007/0157444 | A1 * | 7/2007 | Lawrence et al. | 29/264 |

OTHER PUBLICATIONS

A & E Manufacturing Co., 2000, p. 22, "Wheel Stud Installer Kit for Automobiles", No. 938 and "Wheel Stud Installer Kit for Light Trucks and SUV's", No. 755.

Idea Disclosure Agreement dated Jan. 13, 2005 by Kevin K. Millikan, "Wheel Bolt Press or Installer".

Idea Disclosure Agreement dated Mar. 23, 1998 by Michael E. Krehnovi, "Wheel Stud Installer".

Idea Disclosure Agreement dated Oct. 13, 1993 by Robert Rivera, "Lug Bolt Installer".

Idea Disclosure Agreement dated Jun. 2, 1995 by Mack L. Bishop "Lug Stud Installer and Remover".

Idea Disclosure Agreement dated Dec. 6, 1995 by Brian C. Young, "Universal Wheel Stud Installer".

Idea Disclosure Agreement dated Aug. 13, 1979 by Andrew S. Franko, "Puller to be Used for Installing Studs on Axles".

Idea Disclosure Agreement dated May 28, 1998 by Ken Powell, "On the Car Lug Stud Puller".

Idea Disclosure Agreement dated Nov. 14, 1998 by H. Brian Warrington, "Wheel Stud Installer".

Idea Disclosure Agreement dated Mar. 11, 1999 by Matt Sprakel, "Stud Installer".

(Continued)

*Primary Examiner*—Lee D Wilson
(74) *Attorney, Agent, or Firm*—Banner & Witcoff, Ltd.

(57) ABSTRACT

A stud installation tool includes a thrust bearing mounted within an annular housing so that the bearing may be brought in contact with a wheel hub plate and fitted around a stud which is to be drawn into the plate. Lug nuts for the stud may be tightened against the tool thereby eliminating the necessity for special sizes and styles of stud nuts.

13 Claims, 2 Drawing Sheets

OTHER PUBLICATIONS

Idea Disclosure Agreement dated Apr. 28, 2000 by Douglas Belt, "Wheel Stud Installer".
Idea Disclosure Agreement dated Feb. 17, 1986 by Michael D. Collins, "Wheel Stud Installer".
Idea Disclosure Agreement dated Apr. 21, 1993 by Robert R. Bolmarcich, "Lug Bolt Replacement Tool".
Idea Disclosure Agreement dated Feb. 9, 1981 by Roger O. Cogdill, "Wheel Stud Puller".
Idea Disclosure Agreement dated Nov. 23, 1977 by B. H. Landcaster, "Stud Installation Tool".
Idea Disclosure Agreement dated Sep. 27, 1993 by Robert Lawrence "Automotive Wheel Stud Installer".

* cited by examiner

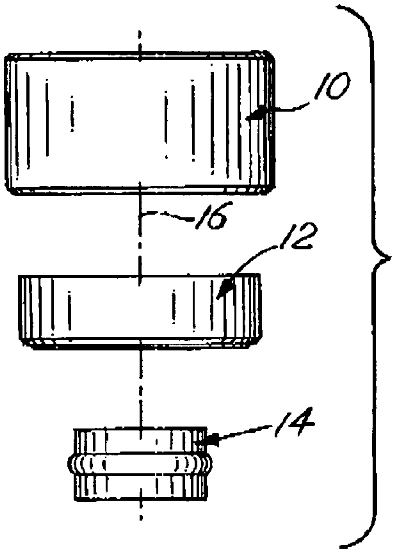
FIG.1
FIG.2
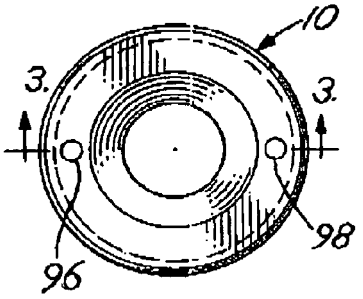
FIG.4
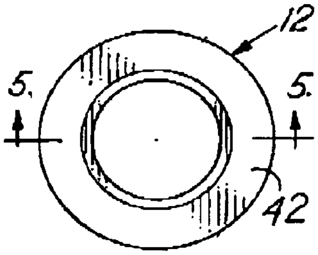
FIG.6
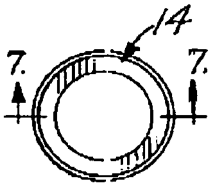
FIG.3
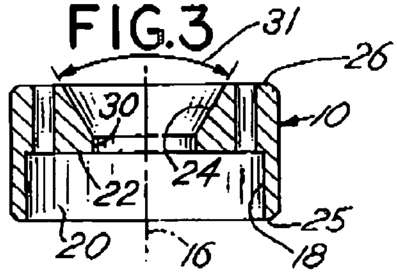
FIG.5
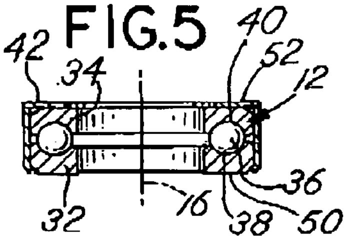
FIG.7
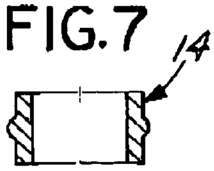

STUD INSTALLATION TOOL AND METHOD OF STUD INSTALLATION

BACKGROUND OF THE INVENTION

In a principal aspect, the present invention relates to a tool which is useful for the installation of studs, particularly the studs that are located on the hub of a motor vehicle for attachment of the wheel rim to the hub.

Typically, in motor vehicles threaded studs extend from a plate of the wheel hub which is attached to the axle of the vehicle. The threaded studs project outwardly from the plate and are designed to cooperate with lug nuts that fasten the wheel rim to the plate. Typically, the studs comprise a headed fastener or bolt with a knurled shaft section adjacent the head. The outer end of the shaft is threaded to enable attachment of a lug nut. The knurled section of the stud shaft is forced through an opening in the plate of the wheel hub to thereby retain the stud.

Studs may break during usage. Also, the threads on the shaft of the stud may become stripped, or other reasons may develop requiring removal and replacement of one or more studs. Replacement may be undertaken by using a drift-punch or other driver to remove the stud from the plate in which it is mounted. Thereafter, a new stud is inserted through the stud opening from the backside of the plate and driven into position. Numerous devices have been proposed for installation of such studs, including those depicted in the following patents:

| Pat. No. | Title |
|---|---|
| 4,741,229 | STUD INSTALLER |
| 4,872,254 | WHEEL STUD INSTALLER AND METHOD |
| 5,209,623 | WHEEL STUD INSTALLATION APPARATUS |
| 5,839,180 | STUD INSTALLER FOR WHEEL STUDS |
| 6,505,390 | METHOD FOR REPLACING WHEEL STUDS |
| 6,618,920 | WHEEL STUD INSTALLATION TOOL |
| 6,823,574 | TOOL FOR INSTALLING WHEEL STUDS |

Additionally, various stud installation tools have been introduced to the marketplace.

While such tools and methods disclosed in the known prior art are quite useful, and capable of performing the desired function, various challenges arise for a mechanic responsible for replacing the studs. For example, studs are provided with various shaft diameters and thread configurations. Consequently, using a tool such as depicted, for example in U.S. Pat. No. 5,209,263, may require special threaded nuts for the replacement of each differently sized or differently threaded stud.

Another challenge that is presented with respect to such stud removal and replacement tools is represented by the certain patents cited above. That is, that forces required to place a stud in a wheel plate are often significant. Consequently providing a device or tool which will enable the easy replacement and insertion of a stud through an opening in a plate is often difficult.

Thus, there has developed a need to provide improved methods for insertion of wheel studs in the hub wheel plate of a motor vehicle. Ease of stud replacement in other environments is also desirable. Another desired feature of a stud replacement tool is the ability to use the tool in confined or restricted spaces. In view of these desires and issues, the present tool was developed.

SUMMARY OF THE INVENTION

Briefly, the present invention is a stud installation tool generally comprised of two, basic component parts. The two, tool parts are generally symmetrical about a longitudinal axis. The first component part comprises an annular thrust bearing, which is inserted into a counterbore at one end of the second component part, namely an annular configured body or housing. The second component part includes an axial throughbore extension of the counterbore. Thus, a stud may be fitted longitudinally through the bore, the thrust-bearing, and the housing in which the bearing is seated. The thrust bearing projects axially slightly beyond the end surface of the housing so that the thrust bearing may impinge against the hub plate in which the stud is to be positioned. The opposite side of the housing includes a generally frustoconical, axial counterbore. The frustoconical counterbore enables the housing to receive a lug nut having a frustoconical axial end or projection which is typically utilized to draw down or tighten a wheel rim on a wheel hub mounting plate.

As a consequence, a tool of the invention has a number of important advantages. First, studs with various diameter shafts may be easily replaced using the tool and matching lug nuts. The throughbore in the tool is, thus, capable of receipt of stud shafts having various diameters. Second, because of the configuration of the body counterbore, which receives the lug nut, lug nuts with a variety of diameters and configuration may easily co-act or cooperate with the tool. The frustoconical configuration of the axial counterbore in one side of the body or housing enables such cooperation.

As a further feature of the invention, the thrust bearing may include an interior dust cover or annular ring which fits against the inside surface of the thrust bearing to protect the bearings from dust, grime and dirt.

As another feature of the invention, the body or housing of the tool may include one or more passages which enable insertion of a probe from one end of the body to drive the bearing from the counterbore at the opposite end of the housing or body. Consequently, if a bearing fails, it may be easily replaced.

An important feature of the invention is the fact that the thrust bearing will impinge, or is designed to impinge, against the stud mounting plate when the tool is properly used. Consequently, when a lug nut is placed upon a stud and drawn or threaded thereon to thereby draw the stud into the plate, the thrust bearing ensures that the body or housing of the tool, which is frictionally engaged by a lug nut, can be easily rotated so as to direct a maximum amount of pulling force on the stud which is being drawn into engagement with through a passage in the mounting plate.

Thus, it is an object of the invention to provide an inexpensive, rugged, and easily useable stud installation tool.

Another object of the invention is to provide a stud installation tool which uses a bearing with an optional dust ring or cover and which is sized to enable the tool to be utilized in combination with studs of multiple diameter and thread configurations.

Another object of the invention is to provide a stud installation tool which does not require a special threaded driving nut associated therewith but which may utilize existing lug nuts associated with the vehicle studs for mounting a wheel rim on the vehicle. Consequently, a minimum number of parts are utilized in the tool of the invention.

These and other objects, advantages, and features of the invention will be set forth in the detailed description which follows.

BRIEF DESCRIPTION OF THE DRAWING

In the detailed description which follows, reference will be made to the drawing comprised of the following figures:

FIG. 1 is an exploded side elevation view of the component parts of the tool;

FIG. 2 is a plan elevation of a body or housing depicted in FIG. 1;

FIG. 3 is a cross-sectional view of the housing or body of FIG. 2, taken along the line 3-3;

FIG. 4 is a plan view of a thrust bearing which is incorporated as a component part of the tool and which is illustrated in FIG. 1;

FIG. 5 is a cross-sectional view of the bearing of FIG. 4 taken along the line 5-5;

FIG. 6 is a plan view of a dust shield, or dust cover, which is depicted in FIG. 1 and may be incorporated with the tool of the invention;

FIG. 7 is a cross-sectional view of the dust shield, or dust cover, of FIG. 6 taken along the line 7-7;

DESCRIPTION OF THE PREFERRED EMBODIMENT

Figure 8:
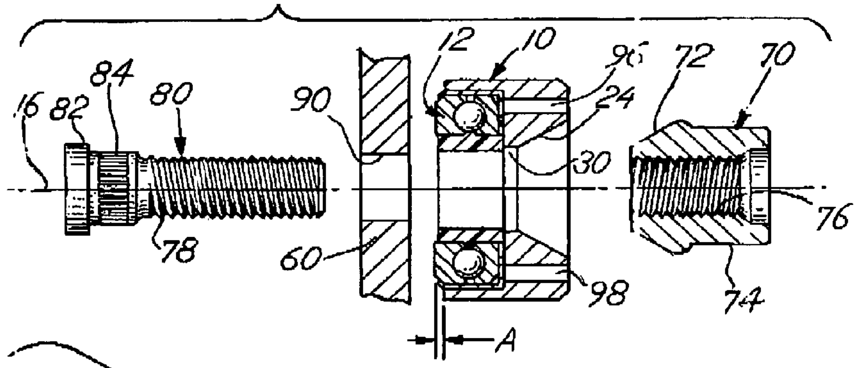
FIG. 8 is an exploded sectional view of the tool of the invention depicted in combination with a stud and wheel hub mounting plate to demonstrate the manner of use and method of the invention.

The tool of the invention is comprised generally of two basic component parts and an optional part. The two basic parts comprise a body or housing 10 and a thrust bearing 12. An optional, but preferred, dust cover 14 is provided for cooperation with the thrust bearing 12 to protect the bearing 14 from dirt and contamination during use. The housing 10, thrust bearing 12, and dust shield or cover 14 are generally symmetrical about a longitudinal axis 16. As shown in FIGS. 2 and 3, the housing or body 10 includes a first counterbore 18 which is generally cylindrical and extends along the axis 16 from one end of housing 10. First counterbore 18 includes a cylindrical side wall 20 and an annular bottom or base wall 22. The first counterbore 18 is symmetrical with and connected via a cylindrical passage to a generally frustoconical shaped counterbore 24 extending from the second or opposite end 26 of the body 10. A shaped throughbore thus extends entirely through the body 10 along the axis 16 between a second side or end 26 to a first end or side 25. The frustoconical counterbore 24 includes a maximum radial dimension generally at the outer surface of the second side 26 and a reduced diameter dimension within the interior of the counterbore generally equal to the diameter of passage 30. The diameters of the frustoconical section 24 at its narrowest point and of passage 27 are chosen so that studs of multiple sizes or diameters of the stud shaft may fit though the counterbores and passage through the body 10. The included angle 31 of the frustoconical counterbore surface 24 is generally about 60°+ 10°. The diameter of cylindrical section 30 and of the through passage of the thrust bearing 12 are chosen to enable a maximum number of various stud shaft sizes to fit through the body 10 as well as the thrust bearing 12 positioned within the body 10 as, for example, depicted in FIG. 8.

The thrust bearing 12 depicted in FIGS. 4 and 5 is a generally annular member comprised of first and second annular bearing sections or parts 32 and 34 separated by and cooperative with a series of ball bearings 36 in channels such as channels 38 and 40. A sleeve 42 holds the bearing members 32 and 34 in a cooperative position. The thrust bearing 12 includes an outer face or surface 50 and an inner face or surface 52. The thrust bearing 12 is inserted to the counterbore 18 and extends axially outwardly from the first surface 25, again, as depicted in FIG. 8 for a distance, A. As a consequence, as explained in detail hereinafter, the thrust bearing 12 may be fitted against the surface of a wheel hub plate 60 to separate the body 10 slightly from the surface of the plate 60.

In the preferred embodiment, a dust cover 14 or dust shield 14 in the form of an annular ring, as depicted in FIGS. 6 and 7, is inserted against the inside surface of the thrust bearing 12. This dust cover 14 protects the bearings within the thrust bearing 12 (e.g., ball bearings) from dust, dirt and grime. The component parts, namely the body 10, the thrust bearing 12 and dust cover 14 are assembled as depicted in FIG. 8. The component parts are coaxial and symmetrical about the axis 16. The body 10 may rotate relative to the bearing 12 as a result of the imposition of a turning force on the body 10. The body 10 and, more particularly, the counterbore 24 is designed to be cooperative with a standard lug nut, such as a lug nut 70 of the type including a frustoconical surface 72 and a polygonal nut drive section 74 symmetrical about axis 16. An internal, axial through passage 76 of nut 70 is threaded and designed to be cooperative with a shaft 78 of a stud 80, which includes a head 82 and knurled section 84. It is noted that most lug nuts 70 have a frustoconical configuration such as that depicted in FIG. 8 and thus the frustoconical section 24 of the body 10 is generally compatible with multiple sizes of lug nuts 70. Also, the lug nut 70 designed for use with stud 80 may be used, thus avoiding the necessity of special lug nuts for use with the tool.

Figure 9:
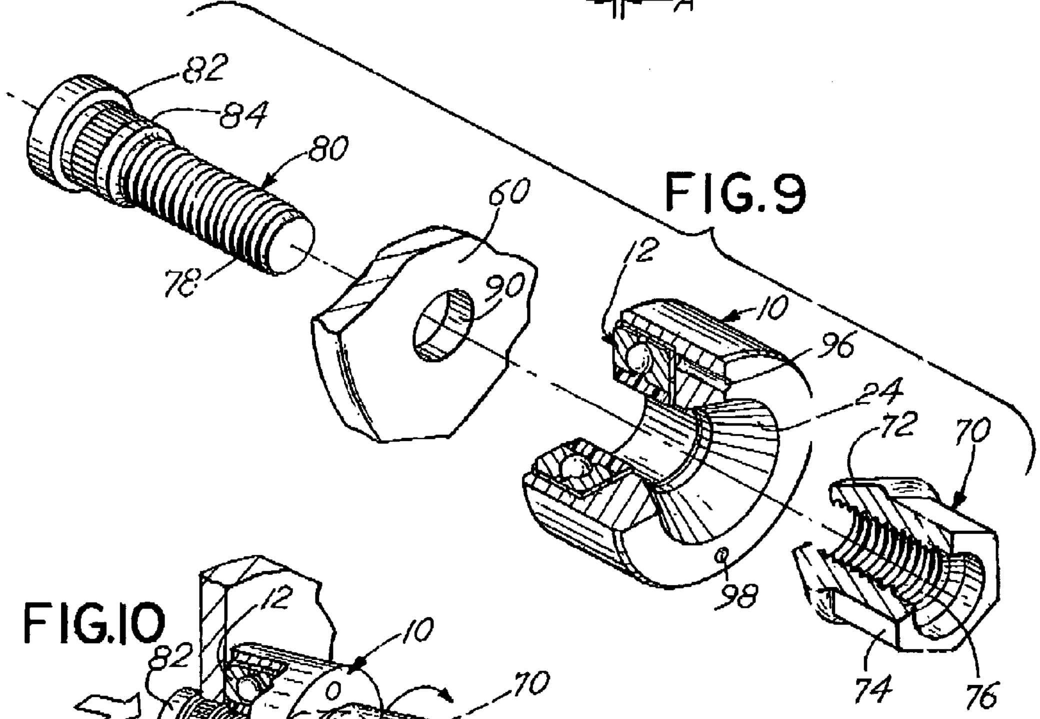
FIG. 9 is an exploded isometric view of the component parts illustrated in FIG. 8, further illustrating the method of the invention.
Figure 10:
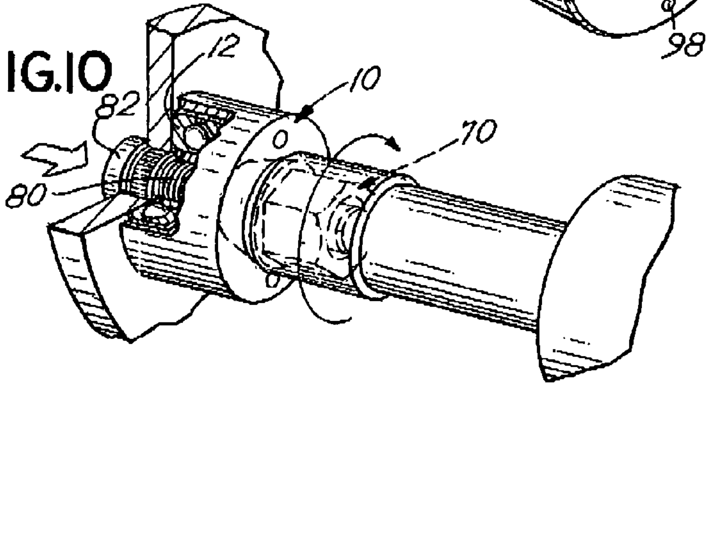
FIG. 10 is an isometric view illustrating in greater detail the method of the invention utilizing the tool.

The method of use of the tool is depicted in FIGS. 8, 9 and 10. Specifically a stud 82 is inserted through a passage 90 in the plate 60. The housing or body 10 is fitted over the opening 90 so that the thrust bearing 12 will be guided against the outer surface of the plate 60. An appropriate standard lug nut 70 is then threaded on the shaft 78 with the frustoconical portion thereof against the surface of the frustoconical section 24 as shown in FIG. 8. Lug nut 70 is then tightened to pull the stud 82 through the opening 90 to engage the knurled sections thereof with the sides of the opening 90 to retain the stud 82 in position within the plate 60.

It is noted that there are axially aligned through passages 96 and 98 radially positioned on opposite sides of the axis 16 within the body 10. Those passages 96 and 98 are aligned with the outer edges of the thrust bearing 12. Thus, if the thrust bearing 12 should fail, a tool may be inserted through the passages 96 and 98 to effect removal of the thrust bearing 12 and permit replacement thereof.

With the tool of the invention, various sizes of studs 80 may be directed through the opening in the body 10 and thrust bearing 12 for engagement with appropriately sized lug nuts 70. Lug nuts of multiple sizes are therefore can be used with the frustoconical opening or counterbore 24 of the body 10. Thus, lug nuts specifically associated with the lugs or studs, such as stud 80, may be used during the installation process associated with use of the tool. As a result, the utilization of specially sized and specially threaded nuts or lug nuts is not required with the tool of the invention. The lug nuts associated with the particular wheel assembly may be utilized to facilitate replacement of the studs.

It is possible to alter the design and configuration of the various component parts while not departing from the spirit and scope of the invention. The particular type of thrust bearing may be varied. For example, ball bearings or roller bearings or other type of bearings may be used. The particular configuration of the various counterbores may also be altered. The utilization of a dust cover and the shape and configuration and material used to make the dust cover or shield may all be varied without departing from the spirit and scope of the invention. The invention is therefore to be limited only by the following claims and equivalents thereof.

What is claimed is:

1. A stud installation tool comprising, in combination:

a generally annular thrust bearing including a longitudinal axis, an axial throughbore, a first general planar support surface transverse to the axis, a second transverse support surface axially spaced from the first surface and transverse to the axis; and a generally annular bearing housing, said housing including a first counterbore extending axially from a first end of said housing for receipt of said thrust bearing with the first surface of said thrust bearing spaced axially from the first end of said housing whereby said bearing may be seated on a surface and said housing is spaced from said surface, said housing further including a second end with a generally frustoconical counterbore extending axially into the housing from said second end with a larger transaxial dimension at the second end and a reduced transaxial dimension between the first and second ends, said housing counterbores connected to define a through passage in the housing for receipt of a threaded stud.

2. The tool of claim 1 in combination with a lug nut for the stud.

3. The tool of claim 2 wherein the lug nut includes a generally frustoconical section for insertion into the frustoconical counterbore of said housing, and a polygonal section for cooperation with a drive device for threading the nut on a stud shaft.

4. The tool of claim 1 wherein the bearing is generally cylindrical.

5. The tool of claim 1 wherein the first counterbore includes a transaxial annular surface including at least one axial passage in the housing extending from the second end to the first counterbore transaxial annular surface.

6. The tool of claim 1 wherein the bearing and housing are symmetrical about the axis.

7. The tool of claim 1 wherein the bearing includes an interior lateral side and further including an annular dust shield insert in the thrust bearing over the lateral side.

8. A stud installation tool comprising, in combination:

a generally annular thrust bearing having a longitudinal axis, an axial throughbore, a first general planar support surface transverse to the axis, a second transverse support surface axially spaced from the first surface and transverse to the axis; and a generally annular bearing housing, said bearing housing including a first housing counterbore extending axially from a first end opening in said housing to a bottom wall in said housing, said thrust bearing first surface spaced axially outward from the first end opening in said housing and said second support surface supported by the bottom wall whereby said thrust bearing second surface is seated on said bottom wall and said first bearing surface is spaced outwardly in the axial direction above the outer surface of said opening said housing further including a second end with a second housing counterbore extending axially into the housing from said housing second end, said second housing counterbore and said bearing axial throughbore connected and coaxial to define a through passage for receipt of a threaded stud.

9. The tool of claim 8 in combination with a lug nut for a stud projecting axially through the bearing and second housing counterbores.

10. The tool of claim 8 wherein the bearing is generally cylindrical.

11. The tool of claim 8 wherein the first counterbore includes a transaxial annular surface and further including at least one axial passage in the housing extending from the second end to the housing first counterbore bottom wall.

12. The tool of claim 8 wherein the bearing and housing are symmetrical about the axis.

13. The tool of claim 8 wherein the bearing includes an interior lateral side and further including an annular dust shield insert in the thrust bearing over the interior lateral side.

* * * * *